US008442138B2

(12) United States Patent
Zhang et al.

(10) Patent No.: US 8,442,138 B2
(45) Date of Patent: May 14, 2013

(54) CODEBOOK SELECTION FOR TRANSMIT BEAMFORMING

(75) Inventors: Hongyuan Zhang, Sunnyvale, CA (US); Rohit U. Nabar, Sunnyvale, CA (US)

(73) Assignee: Marvell World Trade Ltd. (BB)

( * ) Notice: Subject to any disclaimer, the term of this patent is extended or adjusted under 35 U.S.C. 154(b) by 784 days.

(21) Appl. No.: 12/044,117

(22) Filed: Mar. 7, 2008

(65) Prior Publication Data

US 2008/0219373 A1 Sep. 11, 2008

Related U.S. Application Data

(60) Provisional application No. 60/893,472, filed on Mar. 7, 2007.

(51) Int. Cl.
*H04L 5/12* (2006.01)
*H04B 3/36* (2006.01)
*H03M 7/40* (2006.01)

(52) U.S. Cl.
USPC .............................. 375/262; 375/211; 341/67

(58) Field of Classification Search .................. 375/262, 375/211; 341/67
See application file for complete search history.

(56) References Cited

U.S. PATENT DOCUMENTS

| | | | | |
|---|---|---|---|---|
| 5,055,841 A * | 10/1991 | Cordell | ............................. | 341/67 |
| 5,231,485 A * | 7/1993 | Israelsen et al. | .......... | 375/240.03 |
| 5,343,195 A * | 8/1994 | Cooper | ............................ | 341/67 |
| 5,528,238 A * | 6/1996 | Nickerson | ......................... | 341/67 |
| 5,623,262 A * | 4/1997 | Normile et al. | .................. | 341/67 |
| 5,625,356 A * | 4/1997 | Lee et al. | ......................... | 341/67 |
| 5,646,618 A * | 7/1997 | Walsh | .............................. | 341/67 |
| 5,748,121 A * | 5/1998 | Romriell | .......................... | 341/65 |
| 6,614,365 B2 * | 9/2003 | Suzuki et al. | .................... | 341/50 |
| 2003/0085822 A1* | 5/2003 | Scheuermann | ................. | 341/67 |
| 2006/0039493 A1* | 2/2006 | Mukkavilli et al. | ........... | 375/267 |
| 2006/0056534 A1* | 3/2006 | Ionescu et al. | ................ | 375/267 |
| 2006/0092054 A1* | 5/2006 | Li et al. | ........................... | 341/67 |
| 2007/0297498 A1* | 12/2007 | Kramer | ......................... | 375/211 |

FOREIGN PATENT DOCUMENTS

WO    WO2008/109790 A1    9/2008

OTHER PUBLICATIONS

International Search Report issued on Aug. 4, 2008 in related International Application No. PCT/US08/56127.
International Preliminary Report on Patentability issued on Sep. 8, 2009 in related International Application No. PCT/US08/56127.

(Continued)

*Primary Examiner* — David C. Payne
*Assistant Examiner* — Sarah Hassan

(57) ABSTRACT

A method select a codebook for transmit beamforming. The method constructs an estimated channel matrix based on a codebook, selects a channel submatrix from the estimated channel matrix, calculates a selection matrix from the channel submatrix; and assigns a steering matrix based on the selection matrix. There may be multiple codebooks and the method may construct an estimated channel matrix, select a channel submatrix, and calculate a selection matrix for each of the codebooks, then select an optimal codebook. The steering matrix is assigned based on the optimal codebook. The steering matrix may be used in steering a transmitted packet. The method may also calculate a post-MIMO equalizer signal-to-noise ratio for a data stream, based on the estimated channel matrix and the selected codebook. A related system is also disclosed. Other embodiments are provided, and each of the embodiments described herein can be used alone or in combination with one another.

24 Claims, 9 Drawing Sheets

OTHER PUBLICATIONS

Choi et al., "Fast Algorithms for Antenna Selection in MIMO Systems," *Proc. IEEE Vehicular Technology Conference (VTC)*, pp. 1733-1737, Fall 2003, Orlando, FL, Oct. 2003.

Gharavi-Alkhansari et al., "Fast Antenna Subset Selection in MIMO Systems," *IEEE Trans. Signal Processing*, vol. 52:2, pp. 339-347, Feb. 2004.

Gore et al., "Selecting An Optimal Set of Transmit Antennas For a Low Rank Matrix Channel," *Proc. IEEE ICASSP*, pp. 2785-2788, Jun. 2000.

Gorokhov, "Antenna Selection Algorithms for MEA Transmission Systems," *IEEE ICASSP*, pp. 2875-2860, May 2002.

Heath et al., "Antenna Selection for Spatial Multiplexing Systems Based on Minimum Error Rate," *Proc. IEEE International Conference on Communications 2001*, ICC 01, vol. 7, pp. 2276-2280, Jun. 2001.

Molisch et al., "MIMO Systems with Antenna Selection—An Overview," *IEEE Microwave Magazine*, vol. 5:1, pp. 46-56, Mar. 2004.

Proakis et al., *Algorithms For Statistical Signal Processing*, Prentice Hall, 2002 (Table of Contents, pp. 344-358, Index).

Zhang et al., "Fast MIMO Transmit Antenna Selection Algorithms: A Geometric Approach," IEEE Communication Letters, vol. 10:11, Nov. 2006, pp. 754-756.

\* cited by examiner

CODEBOOK SELECTION FOR TRANSMIT BEAMFORMING

CROSS-REFERENCE TO RELATED APPLICATION

This application claims the benefit of U.S. Provisional Application No. 60/893,472, filed Mar. 7, 2007, which is hereby incorporated by reference in its entirety.

TECHNICAL FIELD

The invention relates to multiple-input multiple-output (MIMO) wireless communications. More particularly, the invention relates to codebook selection for transmit beamforming in a MIMO system.

BACKGROUND

A multiple-input multiple-output (MIMO) wireless communication system may utilize multiple antennas at both a transmitter and a receiver to transmit and receive data and to improve the range and performance of the system. Data packets may be independently and simultaneously transmitted in parallel using separate MIMO channel subcarriers on different transmission antennas. At each receiver antenna, the independent data packets may be combined and the receiver may recover the separate data signals with a decoder. Data transmitted and received using a MIMO system may be modulated using orthogonal frequency division multiplexing (OFDM) or other modulation schemes. Examples of MIMO-OFDM systems include wireless local area networking using the IEEE 802.11n standard, wireless metropolitan area networking using the IEEE 802.16e/j/m standards, mobile phone communications using the 3GPP LTE standard, and other systems.

A data packet may be characterized by the equation $y=HQ_{steer}s+n$, where y is the received signal vector, H is the channel state information of a channel subcarrier, $Q_{steer}$ is a spatial steering matrix, s is a transmitted signal vector, and n is an additive noise vector. The spatial steering matrix $Q_{steer}$ may be configured at the transmitter, based on the channel state information H. In other words, the transmitter may utilize the channel state information H of a channel subcarrier to perform transmit beamforming. Transmit beamforming is a technique that may increase the directivity of transmitted data packets and the signal-to-noise ratio gain at the receiver. Channel state information may be maintained by the transmitter using implicit beamforming, where the transmitter estimates the forward channel from the reverse channel, or using explicit beamforming, where the receiver feeds back channel state information or steering matrix information to the transmitter.

A codebook including matrices may be used to calculate the steering matrix $Q_{steer}$. A codebook is a predetermined set of possible steering matrices or possible column vectors of a steering matrix. The final steering matrix $Q_{steer}$ calculation may be conducted by selecting the best steering matrix or the best combination of steering vectors inside the codebook. Computation complexity may be reduced by using a codebook because $Q_{steer}$ need not be explicitly derived as in existing systems. Existing systems may calculate the steering matrix $Q_{steer}$ using singular value decompression (SVD), transmit zero-forcing filter (TxZF), transmit minimum mean square error (TxMMSE), Tomlinson-Harashima precoding (THP), TxMRC, SVD(MRT), cophasing, or other existing algorithms. Such algorithms may require more complex transmitter and receiver design, or have insufficient performance gain, power fluctuation at different transmit antennas, and large overhead for feedback. Therefore, there is a need for an improved codebook selection for transmit beamforming in a MIMO system without these drawbacks.

SUMMARY

The present invention is defined by the following claims, and nothing in this section should be taken as a limitation on those claims.

By way of introduction, the embodiments described below provide a method for selecting a codebook for transmit beamforming. In one embodiment, the method comprises constructing an estimated channel matrix based on a codebook, selecting a channel submatrix from the estimated channel matrix, calculating a selection matrix from the channel submatrix; and assigning a steering matrix based on the selection matrix. If there is a plurality of codebooks, the method may construct an estimated channel matrix, select a channel submatrix, and calculate a selection matrix for each of the plurality of codebooks, then select an optimal codebook. The steering matrix may be assigned based on the optimal codebook. The steering matrix may then be used in steering a transmitted packet. The method may also calculate a post-MIMO equalizer (MEQ) signal-to-noise ratio for a data stream, based on the estimated channel matrix and the selected codebook. A related system is also disclosed.

In another embodiment, a codebook selection system comprises channel matrix estimation means for constructing an estimated channel matrix on a codebook, channel submatrix selection means for selecting a channel submatrix from the estimated channel matrix, selection matrix calculation means for calculating a selection matrix from the channel submatrix, and steering matrix assignment means for assigning a steering matrix based on the selection matrix. The system may include a plurality of codebooks, and the channel matrix estimation means, the channel submatrix selection means, the selection matrix calculation means, and the steering matrix assignment means may operate on each of the plurality of codebooks. The steering matrix assignment means may also be for selecting an optimal codebook based on a criterion, and for assigning the steering matrix based on the selection matrix corresponding to the optimal codebook. The system may also comprise packet transmission means for transmitting the steered packet based on the assigned steering matrix.

The channel matrix estimation means may also be for setting a sounding spatial mapping matrix to a codebook matrix after sending a sounding packet for channel estimation, and calculating an estimated composite channel matrix based on the sounding matrix, if explicit transmit beamforming is being used. If implicit transmit beamforming is being used, the channel matrix estimation means may be for sending a sounding packet from a receiver to a transmitter, calculating an estimated reverse link channel matrix upon receiving the sounding packet at the transmitting, transposing the estimated reverse link channel matrix to form an estimated forward link channel matrix, and multiplying the estimated forward ink channel matrix with the codebook matrix to form an estimated composite channel matrix. The estimated channel matrix may include the estimated composite channel matrix. The channel submatrix selection means may select the submatrix in the estimated composite channel matrix. The channel submatrix selection means may use one or a combination of a Shannon Capacity maximization algorithm, a maximum of weakest post processing signal-to-noise ratio algorithm, an incremental selection algorithm, a decremental selection algorithm, and a correlation of estimated channel matrix columns algorithm. The selection matrix calculator means may also be for calculating the selection matrix at a transmitter, if using implicit transmit beamforming or explicit transmit beamforming with channel state information feedback; or may be for calculating the selection matrix at a receiver, and feeding back the selection matrix to the transmitter, if using explicit transmit beamforming with steering matrix feedback.

The system may also comprise signal-to-noise ratio (SNR) calculator means for calculating a post-MEQ SNR for a data stream, based on the estimated channel matrix and the selected codebook; modulation and coding scheme (MCS) selection means for selecting a MCS based on the post-MEQ SNR; and MCS application means for applying the selected MCS to a steered packet. The SNR calculator means may also be for selecting a column of the estimated channel matrix with a largest norm. The system may include a plurality of data streams, the SNR calculator means may be further for calculating the post-MEQ SNR for each of the plurality of data streams, and the MCS selection means may be further for selecting the optimal MCS based on the post-MEQ SNR. The SNR calculator means may also be further for calculating a norm of each column of the estimated channel matrix, projecting the column to a null space of space spanned by previous columns, calculating a projection of each previous column to a null space of space spanned by remaining columns, if the post-MEQ SNR is directly used, and storing the post-MEQ SNR for the data stream.

In another embodiment, a computer readable medium is encoded with computer executable instructions comprising constructing an estimated channel matrix based on the codebook, selecting a channel submatrix from the estimated channel matrix, calculating a selection matrix from the channel submatrix, and assigning a steering matrix based on the selection matrix. The codebook may include a plurality of codebooks, and the computer readable instructions may perform the constructing, selecting, calculating, and assigning steps on each of the plurality of codebooks. In addition, the instructions may comprise selecting an optimal codebook based on a criterion from the plurality of codebooks, and assigning the steering matrix based on the selection matrix corresponding to the optimal codebook. The instructions may further comprise transmitting a steered packet based on the assigned steering matrix. The instructions may comprise setting a sounding spatial mapping matrix to a codebook matrix after sending a sounding packet for channel estimation, and calculating an estimated composite channel matrix based on the sounding matrix, if explicit transmit beamforming is being used. If implicit transmit beamforming is being used, the instructions may also comprise sending a sounding packet from a receiver to a transmitter, calculating an estimated reverse link channel matrix upon receiving the sounding packet at the transmitting, transposing the estimated reverse link channel matrix to form an estimated forward link channel matrix, and multiplying the estimated forward link channel matrix with the codebook matrix to form an estimated composite channel matrix. The estimated channel matrix may include the estimated composite channel matrix. The instructions may select the submatrix in the estimated composite channel matrix. The instructions for selecting the channel submatrix may comprise the use of one or a combination of a Shannon Capacity maximization algorithm, a maximum of weakest post processing signal-to-noise ratio algorithm, an incremental selection algorithm, a decremental selection algorithm, and a correlation of estimated channel matrix columns algorithm.

In addition, the instructions may comprise calculating a post-MEQ signal-to-noise ratio (SNR) for a data stream, based on the estimated channel matrix and the selected codebook, selecting a modulation and coding scheme (MCS) based on the post-MEQ SNR, generating a selection value corresponding to the selected MCS, and applying the selected MCS to a steered packet. The instructions for calculating the post-MEQ SNR may comprise selecting a column of the estimated channel matrix with a largest norm. The data stream may comprise a plurality of data streams, and the instructions may further comprise calculating the post-MEQ SNR comprises calculating the post-MEQ SNR for each of the plurality of data streams, and selecting the MCS comprises selecting the optimal MCS based on the post-MEQ SNR. The instructions for calculating the post-MEQ SNR for each of the data streams may comprise calculating a norm of each column of the estimated channel matrix, projecting the column to a null space of space spanned by previous columns, calculating a projection of each previous column to a null space of space spanned by remaining columns, if the post-MEQ SNR is directly used, and storing the post-MEQ SNR for the data stream.

Each of the embodiments described herein can be used alone or in combination with one another. The embodiments will now be described with reference to the attached drawings.

BRIEF DESCRIPTION OF THE DRAWINGS

FIG. 6(*b*) is a functional block diagram of a digital versatile disk (DVD).

FIG. 6(*c*) is a functional block diagram of a high definition television.

FIG. 6(*d*) is a functional block diagram of a vehicle control system.

FIG. 6(*e*) is a functional block diagram of a cellular phone.

FIG. 6(*f*) is a functional block diagram of a set top box.

FIG. 6(*g*) is a functional block diagram of a media player.

FIG. 6(*h*) is a functional block diagram of a VoIP phone.

DETAILED DESCRIPTION

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

By way of overview, the embodiments described herein are related to multiple-input multiple-output (MIMO) wireless communications and codebook selection for transmit beamforming in a MIMO system. In the disclosed embodiments, an estimated channel matrix may be constructed based on a codebook. A channel submatrix may be selected from the estimated channel matrix, and a selection matrix may be calculated from the channel submatrix. A steering matrix may be assigned based on the selection matrix. There may be a plurality of codebooks and the method may construct an estimated channel matrix, select a channel submatrix, and calculate a selection matrix for each of the plurality of codebooks. An optimal codebook may be selected and the steering matrix may be assigned based on the optimal codebook. The assigned steering matrix may be used in steering a transmitted packet. A post-MIMO equalizer (MEQ) signal-to-noise ratio for a data stream may also be calculated, based on the estimated channel matrix.

Figure 1:
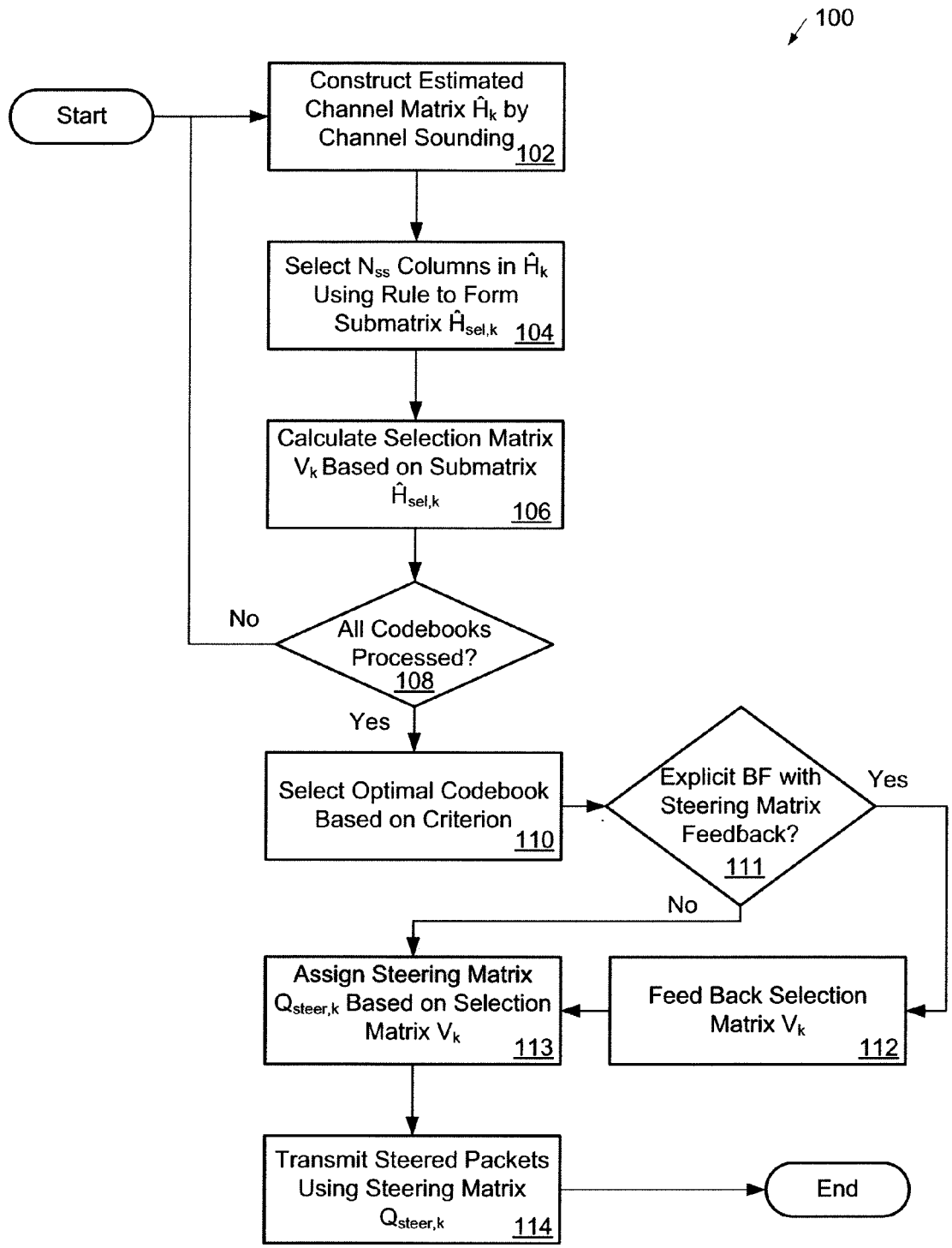
FIG. 1 is a flowchart that represents a method of codebook selection for transmit beamforming of an embodiment.

FIG. 1 is a flowchart that represents a method 100 of codebook selection for transmit beamforming. The method 100 may be used in a MIMO-OFDM system, where the method 100 may be applied in each subcarrier, or in other suitable systems. Transmit beamforming may use channel state information to steer a transmitted data packet, which may result in increased signal directivity and received SNR gain. A transmitted data packet on a channel subcarrier k may be characterized by the equation $y_k = H_k Q_{steer,k} s_k + n_k$, where $y_k$ is the received vector, $H_k$ is the channel state information of a channel subcarrier, $Q_{steer,k}$ is a spatial steering matrix, $s_k$ is a transmitted vector, and $n_k$ is an additive noise vector. The method 100 may select an optimal codebook that results in the assignment of the steering matrix $Q_{steer,k}$, which may be used to steer subsequently transmitted data packets. Selecting an optimal codebook may be beneficial when the number of data streams $N_{SS}$ is less than the number of transmit antennas $N_{TX}$. A codebook $\Omega_i$ may, for purposes of codebook selection, be denoted as a codebook matrix $[\Omega_i]$, which may be a unitary matrix of size $N_{TX} \times N_{TX}$. Each element of the codebook matrix $[\Omega_i]$ may contain the same power, which may reduce power fluctuation over different transmit RF chains and antennas during data packet transmission. The steering matrix for a codebook $\Omega_i$ may be calculated as the best submatrix (e.g., a subset of column vectors) of the codebook matrix $[\Omega_i]$. The final steering matrix $Q_{steer,k}$ may be the selected submatrix among all different codebooks. When there is one codebook, the codebook selection is straightforward.

In Act 102, an estimated channel matrix $\hat{H}_k$ may be constructed by using channel sounding. Channel information from the channel sounding may be used in Act 102 to construct the estimated channel matrix $\hat{H}_k$. Transmit beamforming may be explicit or implicit. When explicit beamforming is used, the estimated channel matrix $\hat{H}_k$ is an estimate of the multiplication of the true channel state information $H_k$ from the transmitter to the receiver of a channel subcarrier k, and the predetermined sounding spatial mapping matrix $Q_{sounding,k}$. The sounding spatial mapping matrix $Q_{sounding,k}$ may be set to one of the codebook matrices $[\Omega_i]$ for all subcarriers k, without loss of generality. The estimated channel matrix $\hat{H}_k$ for a channel subcarrier k may be expressed by the equation $\hat{H}_k = (H_k[\Omega_i])_{est}$.

The receiver may directly get information on the actual channel matrix multiplied with the codebook matrix so that the transmitter or receiver (depending on the type of explicit beamforming used) will perform the codebook selection without a need to re-multiply the matrices. Specifically, if the receiver performs the codebook selection, e.g., during explicit beamforming with steering matrix feedback, the receiver does not need to know what codebook matrix $[\Omega_i]$ is applied at the transmitter. This is due to the feeding back of the selected codebook submatrix or indices of the selected column vectors in the codebook in this case, which allows the receiver to directly select the columns in the matrix $\hat{H}_k$ and feed back the selection matrix or column indices. Similarly, if the transmitter performs the codebook selection, e.g., during explicit beamforming with channel state information matrix feedback, the receiver will directly feed back the matrix $\hat{H}_k$, and the transmitter can perform the selection directly. The channel sounding spatial mapping matrix $Q_{sounding,k}$ is a matrix of size $N_{TX} \times N_{TX}$, and may be a unitary matrix with identical row norms, or may be another size or type of matrix. The device which sends the steered packets is known as a beamformer and a recipient device is known as a beamformee.

On the other hand, when implicit beamforming is used, a sounding packet is sent from the beamformee to the beamformer to get the channel estimation of the reverse link, e.g., the MIMO channel from beamformee to beamformer. The beamformer then transposes the estimated reverse link channel matrix to form an estimated forward link channel matrix. The forward link may be, for example, the MIMO channel from beamformer to beamformee. The beamformer may directly calculate the steering matrix $Q_{steer,k}$ based on the estimated forward link channel matrix. Compared to explicit beamforming, implicit beamforming may reduce the amount of feedback and overhead. The estimated channel matrix $\hat{H}_k$ may be constructed based on the received sounding packet in either case, and is described in more detailed below.

If there is one codebook, the estimated channel matrix $\hat{H}_{k\_CB1}$ for the codebook is equivalent to the estimated channel matrix $\hat{H}_k$, because the codebook selection will default to the one codebook. If there is a plurality of codebooks and if $Q_{sounding,k} = [\Omega_1]$ (without loss of generality), then the estimated channel matrix $\hat{H}_{k\_CBn}$ for each codebook may be computed as $\hat{H}_k [\Omega_{n-1}]^H [\Omega_n] \approx (H_k[\Omega_n])_{est}$, where $[\Omega_{n-1}]^H$ is the conjugate transpose of the codebook $[\Omega_1][\Omega_1]^H$. The codebook $[\Omega_1][\Omega_1]^H$ is equal to an identity matrix because the codebook matrices are unitary. In the case of implicit beamforming, $Q_{sounding,k} = [\Omega_1]$ does not hold and instead $Q_{sounding,k} = I$, e.g., an identity matrix, because the beamformer does not apply any spatial mapping at the receiver upon receiving the sounding packet. Therefore, the estimated channel matrix $\hat{H}_k$ is an estimation of true channel matrix $H_k$, and regardless of the number of codebooks, $\hat{H}_{k\_CBn} = \hat{H}_k[\Omega_n]$. In the case of implicit beamforming and explicit beamforming with channel state information feedback, the remaining acts of the method 100 are performed at the beamformer, e.g., the transmitter. For explicit beamforming with steering matrix feedback, Acts 104, 106, 108, 110, 111, and 112 are performed at the beamformee, e.g., the receiver.

In Act 104, a submatrix $\hat{H}_{sel,k}$ may be formed from the estimated channel matrix $\hat{H}_k$. A number $N_{SS}$ columns may be selected from the estimated channel matrix $\hat{H}_k$ to form the submatrix $\hat{H}_{sel,k}$, where $N_{SS}$ is the number of data streams. If there is a plurality of codebooks, then the number $N_{SS}$ columns may be selected from the estimated channel matrix $\hat{H}_k$ for each of the codebooks. The selection of the $N_{SS}$ columns may be based on one or a combination of known antenna selection algorithms. These algorithms may include a Shannon Capacity maximization algorithm, a maximum of weakest post processing signal-to-noise ratio algorithm, an incremental selection algorithm, a decremental selection algorithm, a correlation of estimated channel matrix columns algorithm, and other suitable algorithms. For example, the incremental selection algorithm may be used, which first selects the column in the estimated channel matrix $\hat{H}_k$ with the largest norm. In further iterations of the incremental selection algorithm, the projection of each of the remaining columns to the null space of the space spanned by the previous selected columns is calculated. Iteration of the incremental selection algorithm may continue until the $N_{SS}$-th column is selected.

In Act 106, a selection matrix $V_k$ may be calculated based on the submatrix $\hat{H}_{sel,k}$. The selection matrix $V_k$ may be composed of $N_{SS}$ columns of a $N_{TX} \times N_{TX}$ identity matrix. In particular, if the i-th column of the estimated-channel matrix $\hat{H}_k$ is selected to be the j-th column in the submatrix $\hat{H}_{sel,k}$ for a given codebook, then the element in the i-th row and j-th column of the selection matrix $V_k$ may be set to be 1. If there is a plurality of codebooks, then the selection matrix $V_k$ for each codebook may be formed as a permutation of $N_{SS}$ columns in an identity matrix. In the case of one codebook, the selection matrix is equal to $V_k$, which is composed of 0s and 1s. In the case of multiple codebooks, the selection matrix $V_k$ for each codebook in a plurality of codebooks may be expressed as $V_k = [\Omega_{n-1}]^H [\Omega_n] \hat{V}_k$, where $\hat{V}_k$ is the selection matrix composed of 0s and 1s. The selection matrix may be calculated at the transmitter or the receiver, depending on what type of beamforming is used, and is described in more detail below.

The method 100 then determines whether all codebooks have been processed in Act 108. If not all codebooks have been processed, then the method 100 returns to Act 102 to construct an estimated channel matrix $\hat{H}_k$ for the next codebook, as described above (e.g., $\hat{H}_k[\Omega_1]^H[\Omega_n] \approx (H_k[\Omega_n])_{est}$). The method 100 continues through Acts 104 and 106 for the next codebook, as described above, to form a submatrix $\hat{H}_{sel,k}$ and calculate a selection matrix $V_k$, and continues until all codebooks are processed. When it is determined that all codebooks have been processed in Act 108, then the method 100 continues to Act 110.

In Act 110, an optimal codebook may be selected based on a certain criterion C. For example, the optimal codebook may be selected by the largest Shannon channel capacity of $\hat{H}_{sel,k}$ for each codebook. If there is one codebook, the optimal codebook is set to the one codebook, by default. If there is a plurality of codebooks, the selected optimal codebook may be denoted as the codebook $n_0$, where $$n_0 = \underset{l=1 \ldots N_{CB}}{\operatorname{argmax}} \, C(\hat{H}_{sel,k\_CB1}).$$

The final selection matrix $V_k$ is then determined by the selection matrix corresponding to the $n_0$-th codebook.

In Act 111, it is determined whether explicit beamforming with steering matrix feedback is being used. If explicit beamforming with steering matrix feedback is used, in Act 112, the selection matrix $V_k$ is fed back from the receiver (beamformee) to the transmitter (beamformer). If there is only one codebook applied in the codebook selection process, $V_k$ is only composed of 0 and 1 elements, as described above with reference to Act 106. The feedback overhead may therefore be greatly reduced in this case. For example, the selection matrix $V_k$ may be fed back in the form of a matrix with a small number of bits representing each of its 0 and 1 elements. In another example, the selection matrix $V_k$ may be fed back as the indices of the selected columns, e.g., if the first and third columns are selected in the estimated channel matrix $\hat{H}_k$ in Act 104, indices "1" and "3" may be fed back, and the transmitter may reconstruct the selection matrix $V_k$ using these indices. In the latter example, the transmitter (beamformer) needs prior knowledge of how to interpret the feedback as column indices.

Act 113 is performed if explicit beamforming with steering matrix feedback is not being used, or following Act 112. In Act 113, at the transmitter (beamformer), regardless of the type of transmit beamforming, the steering matrix $Q_{steer,k}$ may be assigned based on the selection matrix $V_k$ for the optimal codebook selected in Act 110. The steering matrix $Q_{steer,k}$ may be calculated by the equation $Q_{steer,k} = Q_{sounding,k} V_k$, where the channel sounding matrix $Q_{sounding,k}$ was constructed in Act 102 and the selection matrix $V_k$ was calculated in Act 106 and assigned in Act 110, and fed back in Act 112 if explicit beamforming with steering matrix feedback is used. As described above, in the case where one codebook is applied ($N_{CB}=1$), the selection matrix $V_k$ is composed of 1s in certain matrix positions to appropriately select elements of the channel sounding matrix $Q_{sounding,k}$, and 0s in the remaining positions. In this case, the steering matrix $Q_{steer,k}$ may simply be calculated by picking the selected columns in the single codebook matrix $Q_{sounding,k} = [\Omega_1]$. The calculated steering matrix $Q_{steer,k}$ based on the selected optimal codebook may then be used to steer a transmitted data packet in Act 114. The steered transmitted data packet may use $Q_{steer,k}$ as characterized in the equation $y_k = H_k Q_{steer,k} s_k + n_k$ to more precisely direct the data packet. Specifically, the method 100 may calculate a steering matrix $Q_{steer,k}$ that obtains good diversity and spatial multiplexing gains. The steering matrix $Q_{steer,k}$ may have identical row norms, such that there is no transmit power fluctuation. Because there may be no transmit power fluctuation, no calculation is required for power backoff.

In an example of the method 100, the number of transmit antennas $N_{TX}=3$, the number of receive antennas $N_{RX}=3$, the number of data streams $N_{SS}=2$, and the number of codebooks $N_{CB}=1$. The channel sounding matrix $Q_{sounding,k}$ is assigned to the codebook matrix $[\Omega_1]$ in this example, and is equal to $$Q_{sounding,k} = [\Omega_1] = \frac{1}{\sqrt{3}} \begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix}, \forall k.$$

The first and third columns of the channel sounding matrix $Q_{sounding,k}$ may be selected using one of the algorithms described above in Act 104, such as the incremental selection algorithm. Because the first and third columns of the channel sounding matrix $Q_{sounding,k}$ are selected, the selection matrix $V_k$ for the one codebook in this example is equal to $$V_k = V_{k\_CB1} = \begin{bmatrix} 1 & 0 \\ 0 & 0 \\ 0 & 1 \end{bmatrix}$$

in Act 106. In this example, there is only one codebook, and the method 100 continues from Act 108 to Act 110. In Act 110, because there is only one codebook, the one codebook is set as the optimal codebook. The steering matrix $Q_{steer,k}$ is then assigned based on the selection matrix $V_k$ in Act 113, as in the equation $Q_{steer,k} = Q_{sounding,k} V_k$. In this example, $$Q_{steer,k} = \frac{1}{\sqrt{3}} \begin{bmatrix} 1 & 1 & 1 \\ 1 & e^{-j2\pi/3} & e^{j2\pi/3} \\ 1 & e^{j2\pi/3} & e^{-j2\pi/3} \end{bmatrix} \begin{bmatrix} 1 & 0 \\ 0 & 0 \\ 0 & 1 \end{bmatrix} = \frac{1}{\sqrt{3}} \begin{bmatrix} 1 & 1 \\ 1 & e^{j2\pi/3} \\ 1 & e^{-j2\pi/3} \end{bmatrix}.$$

The first and third columns of $Q_{sounding,k}$ are selected by the selection matrix $V_k$, and the resulting steering matrix $Q_{steer,k}$ contains the first and third columns of $Q_{sounding,k}$. Subsequently transmitted data packets may then be steered using the calculated steering matrix $Q_{steer,k}$ in Act 114.

Figure 2:
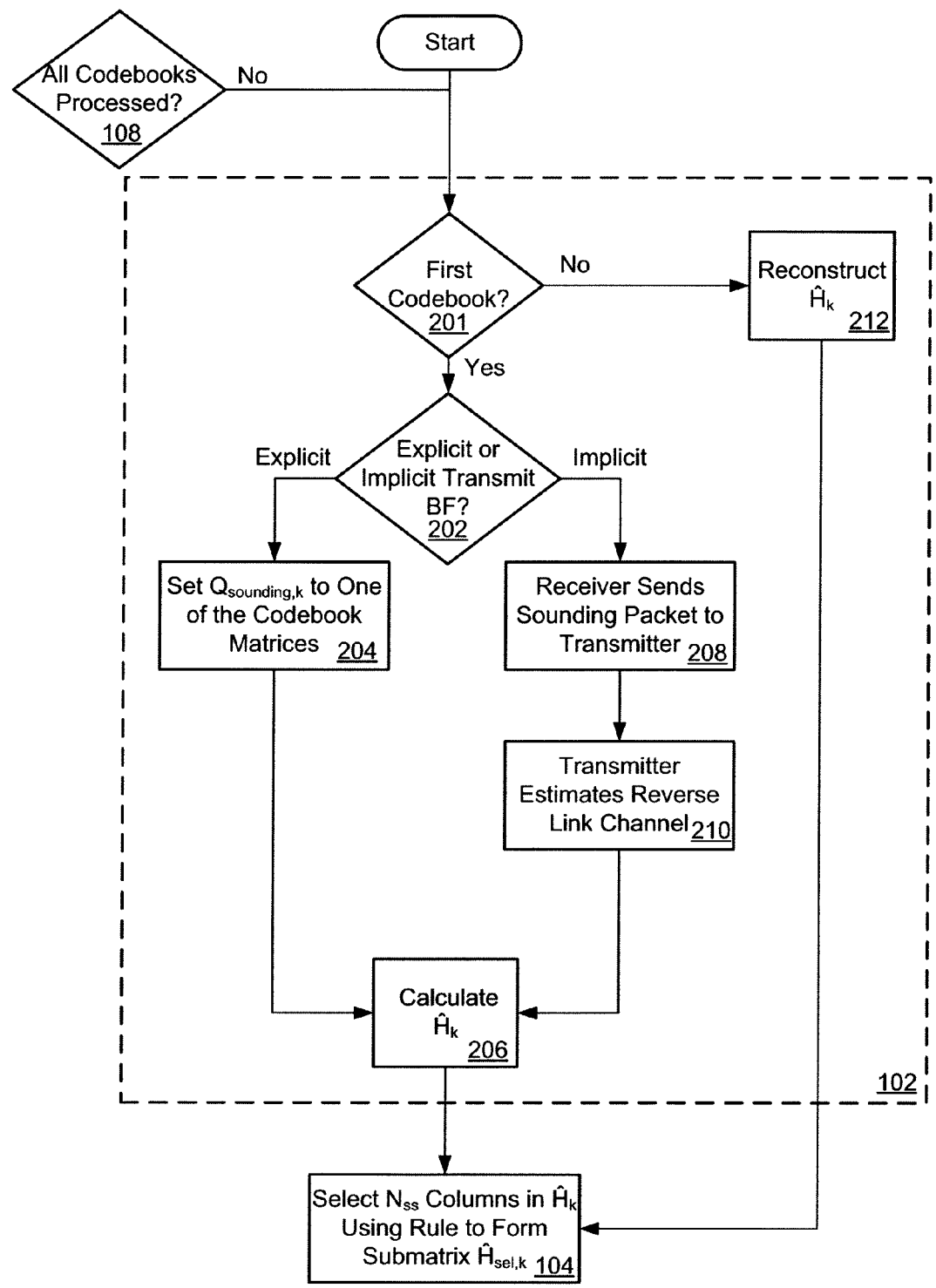
FIG. 2 is a flowchart that represents constructing an estimated channel matrix in the method of codebook selection for transmit beamforming of an embodiment.

FIG. 2 is a flowchart that represents constructing an estimated channel matrix in the method 100 of codebook selection for transmit beamforming. The flowchart of FIG. 2 details Act 102 of FIG. 1 in further describing the construction of the estimated channel matrix $\hat{H}_k$. In Act 201, if the first codebook is being processed, then the method 100 continues to Act 202, otherwise the method 100 continues to Act 212. Act 212 is performed when a second or later codebook is processed. In this case, channel sounding is not needed and the estimated channel matrix $\hat{H}_k$ for the current codebook may be reconstructed by the matrix multiplication $\hat{H}_{k\_CBn} = \hat{H}_k [\Omega_1]^H [\Omega_n] \approx (H_k[\Omega_n])_{est}$, as described above. Following Act 212, the method may continue to Act 104 to select the columns in $\hat{H}_{k\_CBn}$.

If the first codebook is being processed, in Act 202 it is determined whether explicit transmit beamforming or implicit transmit beamforming is being used. If explicit transmit beamforming is being used, then the method continues to Act 204. In Act 204, for the purpose of channel estimation for the first codebook, the channel sounding matrix $Q_{sounding,k}$ may be set to one of the codebook matrices at the transmitter (beamformer), for example, $[\Omega_1]$, for all channel subcarriers k, without loss of generality. The estimated channel matrix $\hat{H}_k$ may be calculated in Act 206, as given by $\hat{H}_k = (H_k[\Omega_i])_{est}$. In the case of explicit beamforming, the calculation of the estimated channel matrix $\hat{H}_k$ occurs at the receiver (beamformee). In particular, when explicit beamforming with channel state information feedback is used, the estimated channel matrix $\hat{H}_k$ is fed back to the transmitter (beamformer) by the receiver (beamformee), and all the remaining steps may be performed at the transmitter. If explicit beamforming with steering matrix feedback is used, the estimated channel matrix $\hat{H}_k$ will be stored at the receiver (beamformee) and Acts 104, 106, 108, 110 and 111 in FIG. 1 are performed at the receiver (beamformee). After the estimated channel matrix $\hat{H}_k$ is calculated in Act 206, the method may continue to Act 104, as described above.

On the other hand, if implicit transmit beamforming is being used, then the method continues to Act 208 after Act 202 for obtaining the estimated channel matrix $\hat{H}_k$ corresponding to the first codebook. In Act 208, the receiver (beamformee) in a MIMO system sends a sounding packet to the transmitter (beamformer). The sounding packet is sent to estimate the MIMO channel, and assumes that there is channel reciprocity between the forward and reverse links (e.g., the channel from beamformee to beamformer is equal to the transposition of the channel from beamformer to beamformee). The MIMO channel estimate may be given by $\hat{H}_k^{(RV)} = (H_k)^T$. In Act 210, the transmitter may perform the reverse link channel estimation $\hat{H}_k^{(RV)}$ and in Act 206, the transmitter may transpose the reverse link channel estimation to form the forward link channel estimation, as given by $\hat{H}_k = (\hat{H}_k^{(RV)})^T$. The method may continue to Act 104, as described above.

Figure 3:
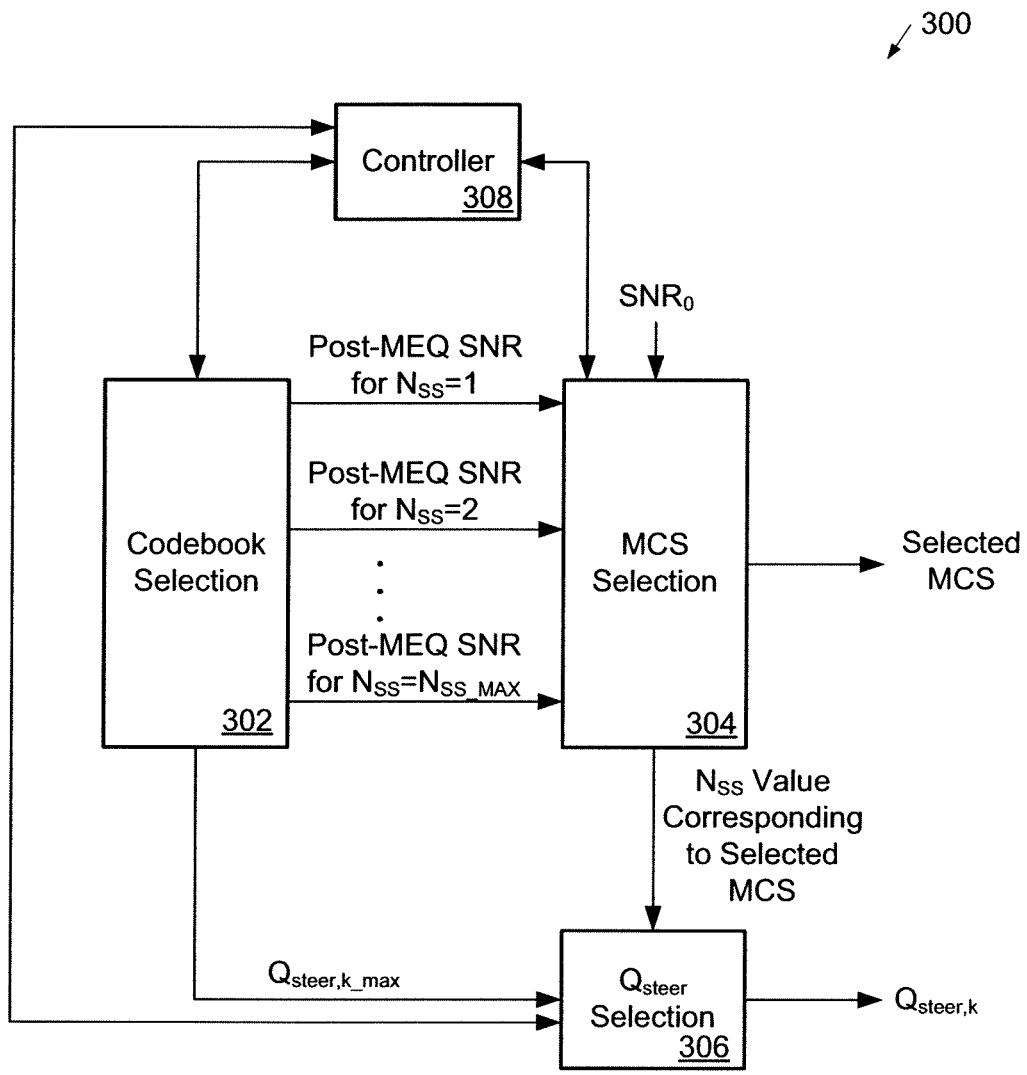
FIG. 3 is a diagram of a system including codebook selection and modulation and coding scheme selection of an embodiment.

FIG. 3 is a diagram of a system 300 including codebook selection 302 and modulation and coding scheme selection 304. The modulation and coding scheme (MCS) determines the different number of spatial streams, the modulation constellations, and the channel error control coding rate on the transmitted signals. When OFDM is applied, MCS may be set to be the same or different over the different subcarriers. The codebook selection 302 may include the method 100, as described above, which describes that the transmitter or the receiver has knowledge of the estimated channel matrix $\hat{H}_k$. Because the estimated channel matrix $\hat{H}_k$ is known, the system 300 may be configured to select an appropriate MCS together with the steering matrices $Q_{steer,k}$ that result from the method 100. MCS selection may be based on the post-MIMO equalizer (MEQ) signal-to-noise ratio (SNR) values in the data streams of a MIMO system. The MIMO equalizer is a MIMO spatial multiplexing detector that suppresses the cross-stream interference on each of the substreams. Post-MEQ SNR values represent the strength of each demultiplexed spatial stream, which gives information on the quality of the stream. In particular, the post-MEQ SNR values for each data stream may be calculated and compared in order to appropriately select a MCS. In FIG. 3, the post-MEQ SNR values are shown for $N_{SS}=1$, $N_{SS}=2$, up to $N_{SS}=N_{SS\_MAX}$, where $N_{SS\_MAX}$ is the maximum number of data streams in the system.

The post-MEQ SNR values calculated by the codebook selection 302 may be multiplied with $SNR_0$, the average SNR at each receiver antenna, and may be used by the MCS selection 304 to reflect the true post-MEQ SNR and to select a MCS. The MCS selection 304 derives the selected MCS by using certain criteria, e.g., by comparing the post-MEQ SNR with predetermined thresholds. The selected MCS also implies the value of $N_{SS}$ (appropriate number of spatial streams). This $N_{SS}$ value is communicated to the $Q_{steer}$ selection 306. The $Q_{steer}$ selection 306 may use the $N_{SS}$ value to reshape the corresponding $Q_{steer,k}$ from the $Q_{steer,k\_max}$ that comes from the codebook selection 302. $Q_{steer,k\_max}$ may denote the steering matrix of the k-th subcarrier after $N_{SS\_MAX}$ (the maximum possible number of spatial streams). For example, if there are three transmit antennas, $N_{SS\_MAX}$ is equal to 2, and the codebook selection 302 may select two columns from the estimated channel matrix $\hat{H}_k$. The selected MCS and the corresponding $Q_{steer,k}$ may be sent to the transmitter to steer transmitted data packets. A controller 308 may also be included in the system 300 that may control and monitor the operation of the codebook selection 302, the modulation and coding scheme selection 304, and the $Q_{steer}$ selection 306.

Figure 4:
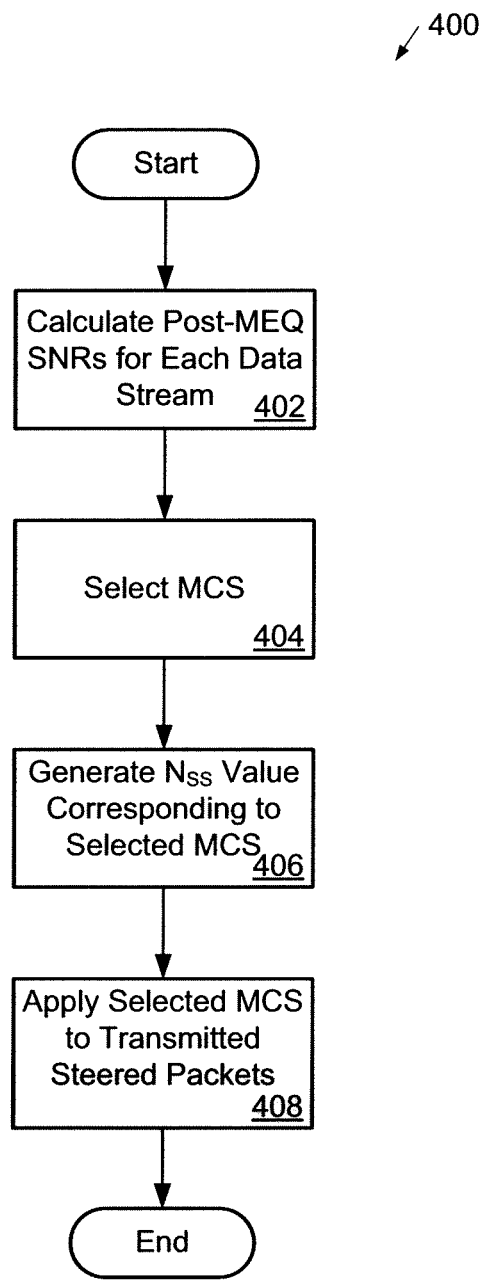
FIG. 4 is a flowchart that represents a method of modulation and coding scheme selection of an embodiment.

FIG. 4 is a flowchart that represents a method 400 of modulation and coding scheme (MCS) selection. In Act 402, post-MEQ signal-to-noise ratio (SNR) values may be calculated for each data stream. The calculation may depend on the selection algorithm used and the number of data streams, as detailed below. The post-MEQ SNR values for each data stream may be stored, and the values used to compare with predetermined thresholds to select an appropriate MCS in Act 404. In particular, the stored post-MEQ SNR values corresponding to the different $N_{SS}$ data streams are compared, and the appropriate MCS is selected. In Act 406, the $N_{SS}$ value corresponding to the selected MCS is generated. This $N_{SS}$ value may be used to reshape the corresponding steering matrix $Q_{steer,k}$ from $Q_{steerk\_max}$. In particular, the steering matrix $Q_{steer,k}$ corresponds to the first $N_{SS}$ columns of $Q_{steer,k\_max}$. In Act 408, the selected MCS and the steering matrix $Q_{steer,k}$ may be applied to steered transmitted data packets.

Figure 5:
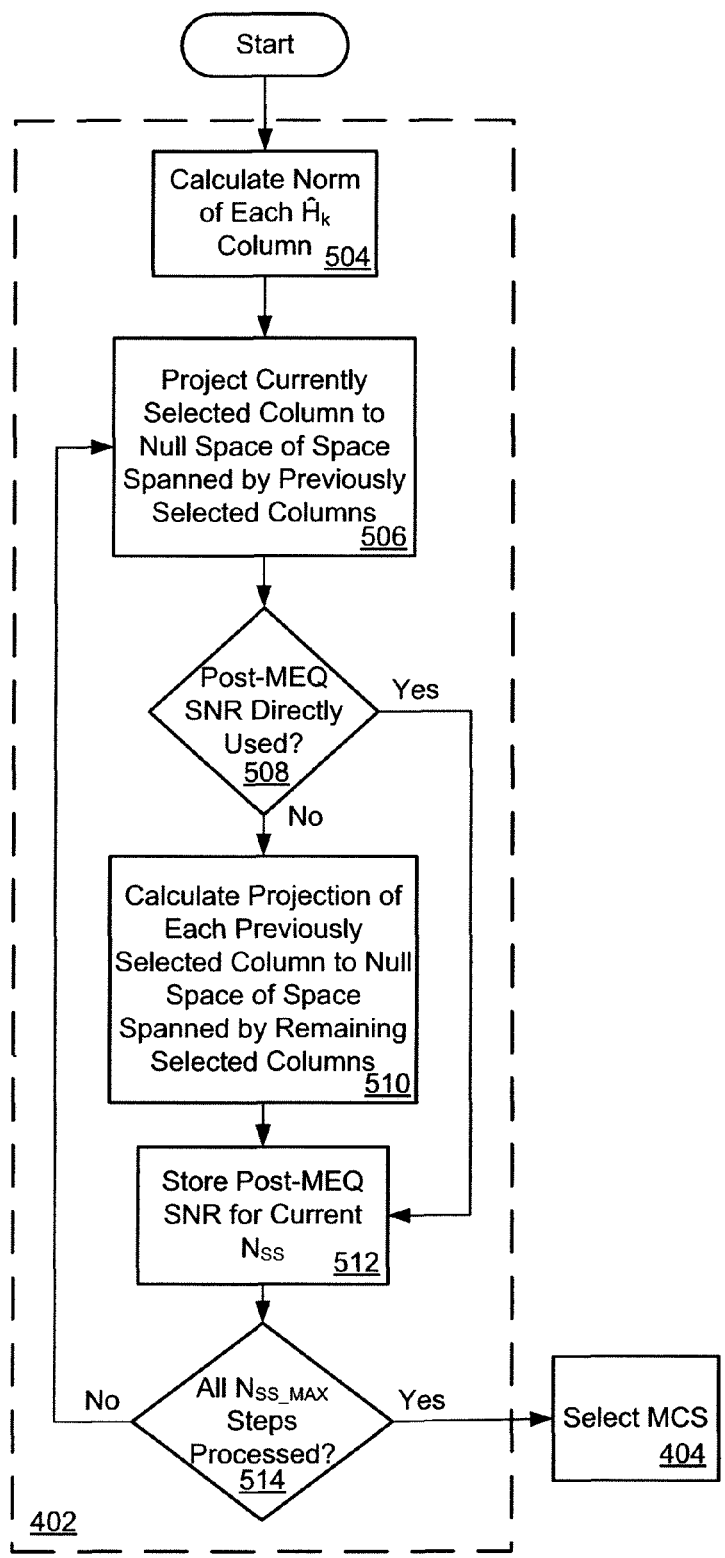
FIG. 5 is a flowchart that represents calculating post-MEQ signal-to-noise ratios for data streams in the method of modulation and coding scheme selection of an embodiment.

FIG. 5 is a flowchart that represents calculating post-MEQ signal-to-noise ratios for data streams in the method 400 of modulation and coding scheme selection. FIG. 5 shows an example of the incremental codebook selection method with one codebook. The flowchart of FIG. 5 details Act 402 of FIG. 4 in further describing the calculation of post-MEQ SNR values for data streams. In Act 504, the norm of each column in the estimated channel matrix $\hat{H}_k$ may be calculated and the column with the largest norm may be selected, as the first step of codebook selection. The calculated norm of a selected column may be proportional to the post-MEQ SNR value when there is one spatial stream ($N_{SS}=1$), as given by $SNR_{N_{ss}=1} = SNR_0 \cdot norm([\hat{H}_k]^*_{(1)})$, where $SNR_0$ is the average SNR at each receive antenna. In Act 506, from the second step to step $N_{SS\_MAX}$ of codebook selection, the currently selected column in the current codebook selection step is projected to the null space of space spanned by previously selected columns. This projection may be proportional to the weakest post-MEQ SNR value, assuming zero-forcing (ZF) MEQ, up to the average SNR value $SNR_0$. ZF MEQ is the receiver MIMO equalizer approach that may completely remove the cross-stream interference in MIMO spatial multiplexing systems.

In Act 508, it is determined whether the post-MEQ SNR value derived in Act 506 for the current codebook selection step is directly used in selecting the MCS. If the post-MEQ SNR value is directly used, then the method continues to Act 512, where the post-MEQ SNR value is stored for the current number of spatial streams under consideration, for use by MCS selection in Act 404. On the other hand, if the post-MEQ SNR value is not directly used, then the method continues to Act 510, where the MCS selection needs the post-MEQ SNR values on each of the data streams. In Act 510, the projections of each of the previously selected columns to the null space of the space spanned by remaining selected columns may be calculated, and the post-MEQ SNR value is calculated in the same way as in Act 506. In Act 512, the post-MEQ SNR value is stored for the current data stream under consideration. Act 514 determines whether all the $N_{SS\_MAX}$ steps of the codebook selection have been processed. If not all of the steps of the codebook selection have been processed, then the method returns to Act 506 and performs a projection, as described above. The method continues through Acts 508, 510, and 512, as described above, and continues until all $N_{SS\_MAX}$ steps of the codebook selection are processed. When the method determines that all $N_{SS\_MAX}$ steps of the codebook selection have been processed in Act 514, then the method continues to Act 404 to perform MCS selection.

Referring now to FIGS. 6(*a*) to 6(*h*), various exemplary implementations of the present invention are shown. Referring to FIG. 6(*a*), the present invention may be embodied in a hard disk drive (HDD) 600. HDD 600 may communicate with a host device (not shown) such as a computer, mobile computing devices such as personal digital assistants, cellular phones, media or MP3 players and the like, and/or other devices via one or more wired or wireless communication links 608.

The present invention may be implemented with either or both signal processing and/or control circuits, which are generally identified in FIG. 6(*a*) at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606. HDD 600 may be connected to memory 609, such as random access memory (RAM), a low latency nonvolatile memory such as flash memory, read only memory (ROM) and/or other suitable electronic data storage.

Referring now to FIG. 6(*b*), the present invention may be implemented in a digital versatile disc (DVD) drive 610. The present invention may be implemented in either or both signal processing and/or control circuits, which are generally identified in FIG. 6(*b*) at 612, and/or mass data storage 618 of DVD drive 610. Signal processing and/or control circuit 612 and/or other circuits (not shown) in DVD drive 610 may process data, perform coding and/or encryption, perform calculations, and/or format data that is read from and/or data written to an optical storage medium 616. In some implementations, signal processing and/or control circuit 612 and/or other circuits (not shown) in DVD drive 610 can also perform other functions such as encoding and/or decoding and/or any other signal processing functions associated with a DVD drive.

DVD drive 610 may communicate with a device (not shown) such as a computer, television or other device via one or more wired or wireless communication links 617. DVD drive 610 may communicate with mass data storage 618 that stores data in a nonvolatile manner. Mass data storage 618 may include a HDD such as that shown in FIG. 6(*a*). The HDD may be a mini HDD that includes one or more platters having a diameter that is smaller than approximately 1.8"DVD drive 610 may be connected to memory 619, such as RAM, ROM, low latency nonvolatile memory such as flash memory, and/or other suitable electronic data storage.

Referring now to FIG. 6(*c*), the present invention may be embodied in a high definition television (HDTV) 620. The present invention may be implemented in either or both signal processing and/or control circuits, which are generally identified in FIG. 6(*c*) at 622, a WLAN interface 629 and/or mass data storage 627 of the HDTV 620. HDTV 620 may receive HDTV input signals in either a wired or wireless format via one or more wired or wireless communication links 624 and generate HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. At least one HDD may have the configuration shown in either FIG. 6(*a*) and/or at least one DVD may have the configuration shown in FIG. 6(*b*). The HDD may be a mini HDD that includes one or more platters having a diameter that is smaller than approximately 1.8"HDTV 620 may be connected to memory 628 such as RAM, ROM, low latency nonvolatile memory such as flash memory and/or other suitable electronic data storage. HDTV 620 also may support connections with a WLAN via a WLAN network interface 629.

Referring now to FIG. 6(*d*), the present invention may be implemented in a control system of a vehicle 630, a WLAN interface 648 and/or mass data storage 646 of the vehicle control system. In some implementations, the present invention is implemented in a power-train control system 632 that receives inputs from one or more sensors 636 such as temperature sensors, pressure sensors, rotational sensors, airflow sensors and/or any other suitable sensors and/or that generates one or more output control signals such as engine operating parameters, transmission operating parameters, and/or other control signals at one or more output(s) 638.

The present invention may also be embodied in other control systems 640 of vehicle 630. Control system 640 may likewise receive signals from input sensors 642 and/or output control signals to one or more output(s) 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices, for example HDDs and/or DVDs. At least one HDD may have the configuration shown in FIG. 6(*a*) and/or at least one DVD may have the configuration shown in FIG. 6(b). The HDD may be a mini HDD that includes one or more platters having a diameter that is smaller than approximately 1.8"Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. The control system 640 may also include mass data storage, memory and/or a WLAN interface (all not shown).

Figure 6A:
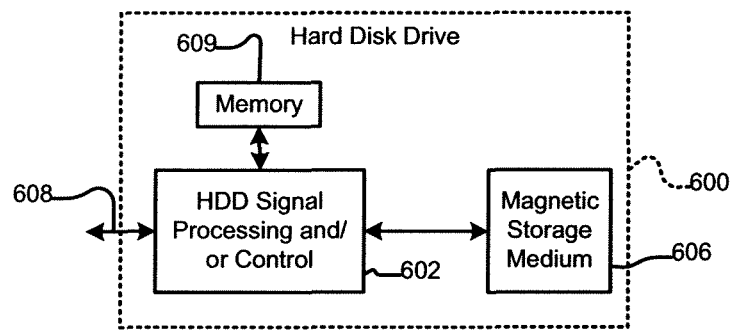
FIG. 6(*a*) is a functional block diagram of a hard disk drive.
Figure 6B:
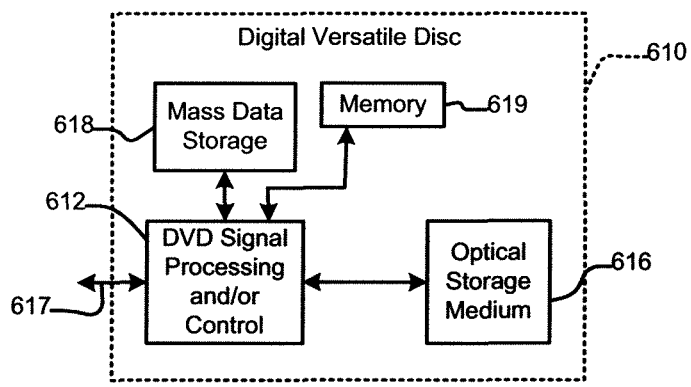
Figure 6C:
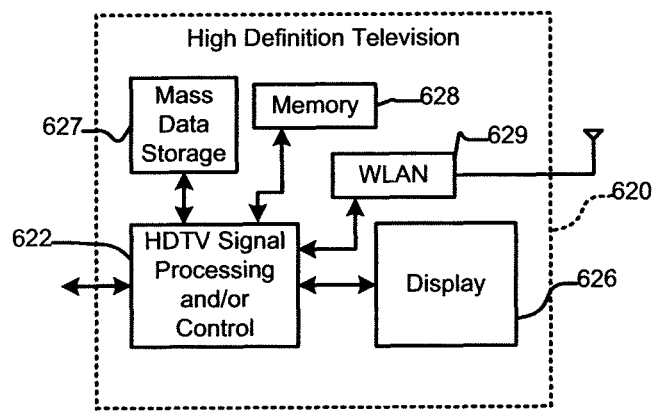
Figure 6D:
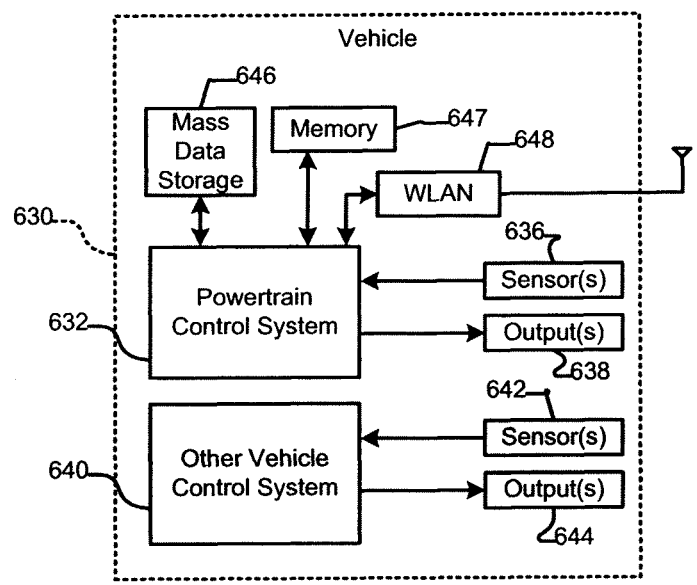
Figure 6E:
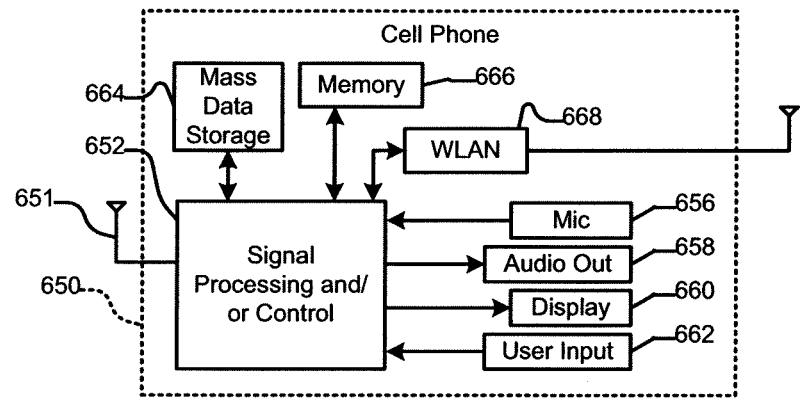

Referring now to FIG. 6(e), the present invention may be embodied in a cellular phone 650 that may include a cellular antenna 651. The present invention may be implemented in either or both signal processing and/or control circuits, which are generally identified in FIG. 6(e) at 652, a WLAN interface and/or mass data storage of the cellular phone 650. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Cellular phone 650 may communicate with mass data storage 664 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8"Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Figure 6F:
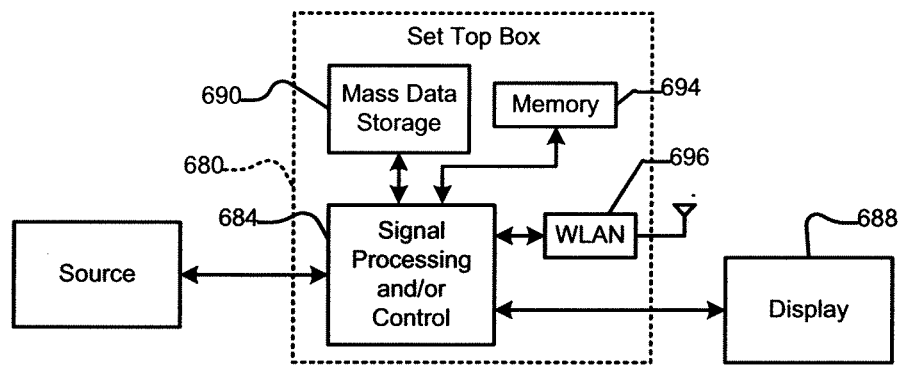

Referring now to FIG. 6(f), the present invention may be embodied in a set top box 680. The present invention may be implemented in either or both signal processing and/or control circuits, which are generally identified in FIG. 6(f) at 684, a WLAN interface and/or mass data storage of the set top box 680. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Set top box 680 may communicate with mass data storage 690 that stores data in a nonvolatile manner. Mass data storage 690 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8"Set top box 680 may be connected to memory 694 such as RAM, ROM, low latency nonvolatile memory such as flash memory and/or other suitable electronic data storage. Set top box 680 also may support connections with a WLAN via a WLAN network interface 696.

Figure 6G:
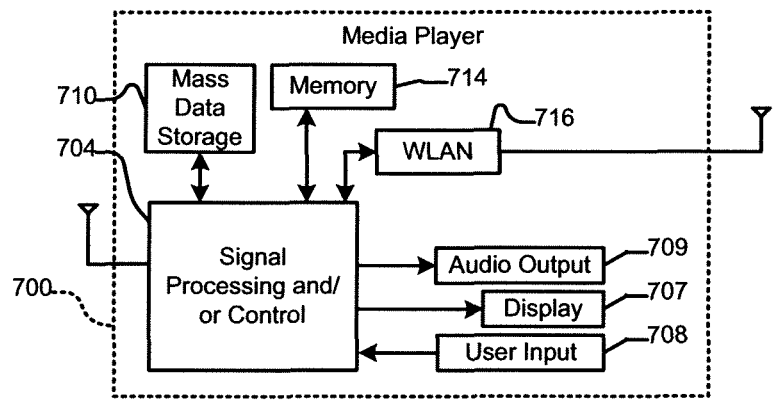

Referring now to FIG. 6(g), the present invention may be embodied in a media player 700. The present invention may be implemented in either or both signal processing and/or control circuits, which are generally identified in FIG. 6(g) at 704, a WLAN interface and/or mass data storage of the media player 700. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage 710 may include optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8".

Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Figure 6H:
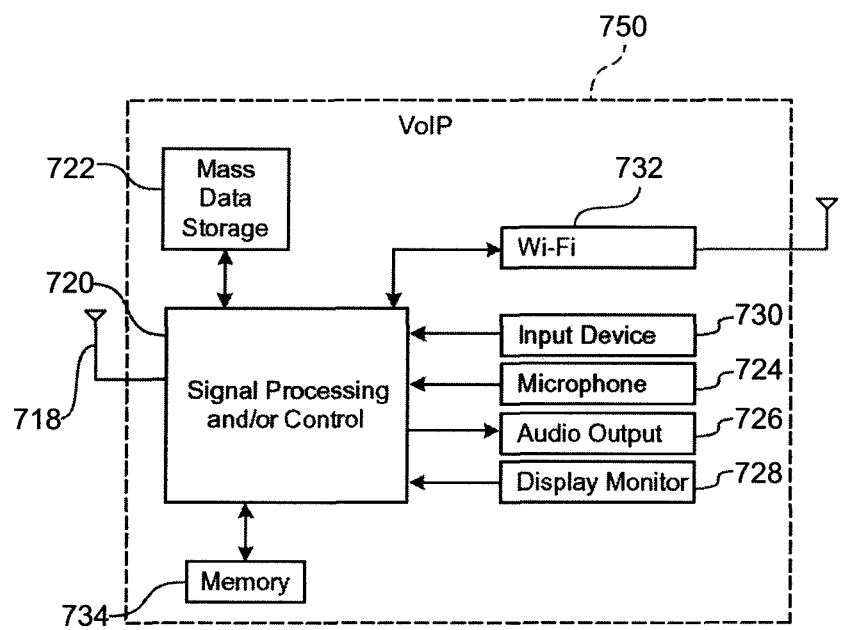

Referring to FIG. 6(h), the present invention may be embodied in a Voice over Internet Protocol (VoIP) phone 750 that may include an antenna 718. The present invention may be implemented in either or both signal processing and/or control circuits, which are generally identified in FIG. 6(h) at 720, a wireless interface and/or mass data storage of the VoIP phone 750. In some implementations, VoIP phone 750 includes, in part, a microphone 724, an audio output 726 such as a speaker and/or audio output jack, a display monitor 728, an input device 730 such as a keypad, pointing device, voice actuation and/or other input devices, and a Wi-Fi communication module 732. Signal processing and/or control circuits 720 and/or other circuits (not shown) in VoIP phone 750 may process data, perform coding and/or encryption, perform calculations, format data and/or perform other VoIP phone functions.

VoIP phone 750 may communicate with mass data storage 722 that stores data in a nonvolatile manner such as optical and/or magnetic storage devices, for example HDDs and/or DVDs. At least one HDD may have a configuration shown in FIG. 6(a) and/or at least one DVD may have the configuration shown in FIG. 6(b). The HDD may be a mini HDD that includes one or more platters having a diameter that is smaller than approximately 1.8"VoIP phone 750 may be connected to memory 734, which may be a RAM, ROM, low latency nonvolatile memory such as flash memory and/or other suitable electronic data storage. VoIP phone 750 is configured to establish communications link with a VoIP network (not shown) via Wi-Fi communication module 732.

All of the discussion above, regardless of the particular implementation being described, is exemplary in nature, rather than limiting. Although specific components of the codebook selection for transmit beamforming are described, methods, systems, and articles of manufacture consistent with the codebook selection for transmit beamforming may include additional or different components. For example, components of the codebook selection for transmit beamforming may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the codebook selection for transmit beamforming may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A method for selecting a codebook, comprising:
   receiving, by a beamformee, channel state information and a sounding spatial mapping matrix set to a codebook from a beamformer, the codebook used to assign a steering matrix for transmit beamforming;
   constructing, using at least one controller, an estimated channel matrix based on the sounding spatial mapping matrix set to the codebook received from the beamformer, the sounding spatial mapping matrix being stored in a memory;
   selecting, using the at least one controller, a channel submatrix from the estimated channel matrix;
   calculating, using the at least one controller, a selection matrix from the channel submatrix; and
   assigning, using the at least one controller, a steering matrix based on the selection matrix.

2. The method of claim 1, wherein:
   the codebook comprises a plurality of codebooks;
   constructing the estimated channel matrix comprises constructing the estimated channel matrix for each of the plurality of codebooks;
   selecting the channel submatrix comprises selecting the channel submatrix for each of the plurality of codebooks;
   calculating the selection matrix comprises calculating the selection matrix for each of the plurality of codebooks; and
   assigning the steering matrix comprises:
   selecting an optimal codebook based on a criterion from the plurality of codebooks; and
   assigning the steering matrix based on the selection matrix corresponding to the optimal codebook.

3. The method of claim 1, further comprising transmitting a steered packet based on the assigned steering matrix.

4. The method of claim 1, further comprising:
   setting the sounding spatial mapping matrix to the codebook for sending a sounding packet;
   wherein constructing the estimated channel matrix comprises:
   calculating an estimated composite channel matrix based on the codebook, wherein the estimated composite channel matrix is the multiplication of a channel matrix and the sounding spatial mapping matrix;
   constructing the estimated composite channel matrix based on each of the other codebooks in the case that the codebook comprises a plurality of codebooks;
   multiplying the existing estimated composite channel matrix with the transpose conjugate of the first codebook matrix applied as the sounding spatial mapping matrix;
   multiplying the result with the currently considered codebook matrix.

5. The method of claim 1, wherein calculating the selection matrix comprises:
   if using implicit transmit beamforming or explicit transmit beamforming with channel state information feedback, calculating the selection matrix at the beamformer;
   if using explicit transmit beamforming with steering matrix feedback, calculating the selection matrix at the beamformee, and feeding back the selection matrix to the beamformer.

6. The method of claim 5, wherein if using explicit transmit beamforming with steering matrix feedback, and if the codebook contains only one codebook, the selection matrix fed back to the beamformer comprises 0 and 1 elements;
   further wherein the feedback matrix is either in the form of a matrix with quantized elements with small number of quantization bit(s), or in the form of the indices numbers of the selected columns so that the beamformer, before assigning the steering matrix, can translate the indices numbers back to the selection matrix.

7. The method of claim 1, further comprising:
   calculating a post-MEQ signal-to-noise ratio (SNR) for a data stream, based on the estimated channel matrix and the codebook;
   selecting a modulation and coding scheme (MCS) based on the post-MEQ SNR;
   generating a selection value corresponding to the selected MCS; and
   applying the selected MCS to a steered packet.

8. The method of claim 7, wherein calculating the post-MEQ SNR comprises selecting a column of the estimated channel matrix with a largest norm.

9. The method of claim 7, wherein:
   the data stream comprises a plurality of data streams;
   calculating the post-MEQ SNR comprises calculating the post-MEQ SNR for each of the plurality of data streams; and
   selecting the MCS comprises selecting the optimal MCS based on the post-MEQ SNR.

10. The method of claim 9, wherein calculating the post-MEQ SNR for each of the plurality of data streams comprises:
    calculating a norm of each column of the estimated channel matrix;
    projecting the column to a null space of space spanned by previous columns;
    calculating a projection of each previous column to a null space of space spanned by remaining columns, if the post-MEQ SNR is directly used; and
    storing the post-MEQ SNR for the data stream.

11. A codebook selection system, comprising:
a beamformee having at least one receiver that is configured to receive channel state information and a sounding spatial mapping matrix set to a codebook from a beamformer, the codebook used to assign a steering matrix for transmit beamforming;
at least one memory configured to store the codebook; and
one or more controllers in communication with the at least one memory, the one or more controllers configured to:
  construct an estimated channel matrix based on the codebook received from the beamformer;
  select a channel submatrix from the estimated channel matrix;
  calculate a selection matrix from the channel submatrix; and
  assign a steering matrix based on the selection matrix.

12. The system of claim 11, wherein:
the codebook comprises a plurality of codebooks;
the one or more controllers further configured to:
  construct the estimated channel matrix for each of the plurality of codebooks;
  select the channel submatrix for each of the plurality of codebooks;
  calculate the selection matrix for each of the plurality of codebooks;
  select an optimal codebook based on a criterion from the plurality of codebooks; and
  assign the steering matrix based on the selection matrix corresponding to the optimal codebook.

13. The system of claim 11, further comprising a packet transmitter in communication with the one or more controllers, the packet transmitter configured to transmit a steered packet based on the assigned steering matrix.

14. The system of claim 11, wherein the one or more controllers is further configured to:
set the sounding spatial mapping matrix to the codebook for sending a sounding packet, and calculate an estimated composite channel matrix based on the codebook, wherein the estimated composite channel matrix is the multiplication of a channel matrix and the sounding spatial mapping matrix;
construct the estimated composite channel matrix based on each of the other codebooks in the case that the codebook comprises a plurality of codebooks;
multiply the existing estimated composite channel matrix with the transpose conjugate of the first codebook matrix applied as the sounding spatial mapping matrix; and
multiply the result with the currently considered codebook matrix.

15. The system of claim 11, wherein the one or more controllers is further configured to use one or a combination of: a Shannon Capacity maximization algorithm, a maximum of weakest post processing signal-to-noise ratio algorithm, an incremental selection algorithm, a decremental selection algorithm, and a correlation of estimated channel matrix columns algorithm.

16. The system of claim 11, wherein the one or more controllers is further configured to:
if using implicit transmit beamforming or explicit transmit beamforming with channel state information feedback, calculate the selection matrix at the beamformer;
if using explicit transmit beamforming with steering matrix feedback, calculate the selection matrix at the beamformee, and feed back the selection matrix to the beamformer.

17. The system of claim 16, wherein if using explicit transmit beamforming with steering matrix feedback, and if the codebook contains only one codebook, the selection matrix fed back to the beamformer comprises 0 and 1 elements, wherein the feedback matrix is either in the form of a matrix with quantized elements with small number of quantization bit(s), or in the form of the indices numbers of the selected columns so that the beamformer, before assigning the steering matrix, can translate the indices numbers back to the selection matrix.

18. The system of claim 11, wherein the one or more controllers is further configured to:
calculate for a post-MEQ SNR for a data stream, based on the estimated channel matrix and the codebook;
select a MCS based on the post-MEQ SNR;
generate a selection value corresponding to the selected MCS; and
apply the selected MCS to a steered packet.

19. The system of claim 18, wherein:
the data stream comprises a plurality of data streams;
the one or more controllers is further configured to:
  calculate the post-MEQ SNR for each of the plurality of data streams; and
  select the optimal MCS based on the post MEQ SNR.

20. The system of claim 19, wherein the one or more controllers is further configured to:
calculate a norm of each column of the estimated channel matrix;
project the column to a null space of space spanned by previous columns;
calculate a projection of each previous column to a null space of space spanned by remaining columns, if the post-MEQ SNR is directly used; and
store the post-MEQ SNR for the data stream.

21. The method of claim 1, wherein receiving channel state information and the sounding spatial mapping matrix set to a codebook from a beamformer comprises receiving the channel state information multiplied by the codebook.

22. The method of claim 1, wherein receiving, by the beamformee, channel state information and the sounding spatial mapping matrix set to the codebook from the beamformer comprises receiving, by the beamformee, channel state information and the sounding spatial mapping matrix set to the codebook from the beamformer if using explicit beam forming, the method further comprises:
if using implicit transmit beamforming:
sending a sounding packet from the beamformee to beamformer;
calculating an estimated reverse link channel matrix based on the received sounding packet at the beamformer;
transposing the estimated reverse link channel matrix to form an estimated forward link channel matrix; and
calculating an estimated composite channel matrix by multiplying the estimated forward link channel matrix and the codebook matrix.

23. The system of claim 11, wherein the at least one receiver of the beamformee is configured to receive the channel state information and sounding spatial mapping index set to the codebook from the beamformer if using explicit transmit beamforming, and
if using implicit transmit beamforming, the beamformer comprises at least one receiver that is configured to receive a sounding packet from the beamformee; and
wherein the one or more controllers are configured to:
  calculate an estimated reverse link channel matrix based on the received sounding packet at the beamformer;
  transpose an estimated reverse link channel matrix to form an estimated forward link channel matrix; and calculate the estimated composite channel matrix by multiplying the estimated forward link channel matrix and the codebook matrix.

24. A method for selecting a codebook, comprising:

receiving, by a beamformee, channel state information multiplied by a codebook, the codebook used to assign a steering matrix for transmit beamforming;

constructing, using at least one controller, an estimated channel matrix based on the received channel state information multiplied by the codebook, the codebook being stored in a memory;

selecting, using the at least one controller, a channel submatrix from the estimated channel matrix;

calculating, using the at least one controller, a selection matrix from the channel submatrix; and assigning, using the at least one controller, a steering matrix based on the selection matrix.

* * * * *